United States Patent
Stephan et al.

(10) Patent No.: US 6,619,212 B1
(45) Date of Patent: Sep. 16, 2003

(54) METHOD FOR ACHIEVING AND MAINTAINING DESIRED SPEED ON A GUIDEWAY SYSTEM

(75) Inventors: Craig Hammann Stephan, Ann Arbor, MI (US); John Michael Miller, Saline, MI (US); Lloyd Craig Davis, Plymouth, MI (US); Richard David Anderson, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/063,028

(22) Filed: Mar. 13, 2002

(51) Int. Cl.[7] .................................................. B60L 13/00
(52) U.S. Cl. ...................... 104/292; 104/290; 318/587; 701/23
(58) Field of Search ................................ 104/288, 287, 104/290, 292; 318/587; 701/23

(56) References Cited

U.S. PATENT DOCUMENTS

| | | | |
|---|---|---|---|
| 3,254,608 A | | 6/1966 | Alden |
| 3,650,216 A | * | 3/1972 | Harwick et al. ............ 104/288 |
| 3,872,793 A | | 3/1975 | Patin |

(List continued on next page.)

OTHER PUBLICATIONS

"Inductive Power Transfer to an Electric Vehicle", Lashkari et al, Systems Control Technology, Inc., Palo Alto, CA, EVS 8, Oct. 1986, pp. 258–267.

"Contactless Power Delivery System for Mining Applications", Klontz et al, IEEE 1991, pp. 1263–1269.

Auto 2010, Van Valkenburgh, 1991, pp. 25–27.

"A PRT System for European Cities", Martin V. Lowson, International Conf. on PRT and other Emerging Transport Systems, Minneapolis, Nov. 18–20, 1997, pp. 1–9.

"Coding of Road Information for Automated Highways", Guldner et al, ITS Journal, 1999, vol. 4, pp. 187–207.

California PATH, Annual Report 1999, 33 pp.

"A Polyphase Cartesian Vector Approach to Control o fPolyphase AC Machines", Slobodan Gataric, IEEE IAS Oct. 2000, 7 pp.

"Maglev: A New Approach", Richard F. Post, Scientific American Jan. 2000, pp. 82–87.

"What if Cars Could Drive Themselves?", Steven E. Shladover, Institute of Transportation Studies, Univ. of California, Berkeley, Access No. 16, Spring 2000, pp. 2–7.

*Primary Examiner*—S. Joseph Morano
*Assistant Examiner*—Larb A. Olson

(57) ABSTRACT

A method is provided for controlling operation of a vehicle on a guideway system, wherein the vehicle includes a first element of a linear induction motor and an alternate power source, and the guideway system has an acceleration section including a second element of the linear induction motor, and a computer control system. The method includes utilizing the second element in cooperation with the first element so as to accelerate the vehicle on the acceleration section of the guideway system, and providing speed instructions to the vehicle using the computer control system so as to cause the vehicle to use the alternate power source to maintain a desired cruising speed on a main section of the guideway system.

15 Claims, 8 Drawing Sheets

U.S. PATENT DOCUMENTS

| | | | |
|---|---|---|---|
| 3,875,856 A | | 4/1975 | Meeker |
| 3,941,201 A | * | 3/1976 | Hermann et al. ............ 180/168 |
| 3,974,778 A | * | 8/1976 | Black et al. ................. 104/292 |
| 4,014,503 A | | 3/1977 | Raimer |
| 4,061,089 A | | 12/1977 | Sawyer |
| 4,092,554 A | | 5/1978 | Quinn |
| 4,215,837 A | | 8/1980 | Uozumi et al. |
| 4,635,560 A | | 1/1987 | Ballantyne |
| 4,800,818 A | | 1/1989 | Kawaguchi et al. |
| 4,836,344 A | | 6/1989 | Bolger |
| 4,931,677 A | | 6/1990 | Heidelberg et al. |
| 4,970,964 A | | 11/1990 | Burg et al. |
| 5,127,599 A | | 7/1992 | Veraart |
| 5,148,753 A | * | 9/1992 | Lapp et al. ................. 104/290 |
| 5,174,215 A | | 12/1992 | Barrows |
| 5,270,593 A | | 12/1993 | Levi et al. |
| 5,277,125 A | | 1/1994 | DiFonso et al. |
| 5,289,778 A | | 3/1994 | Romine |
| 5,317,976 A | | 6/1994 | Aruga et al. |
| 5,341,280 A | | 8/1994 | Divan et al. |
| 5,473,233 A | | 12/1995 | Stull et al. |
| 5,476,046 A | | 12/1995 | Kalsi |
| 5,542,356 A | | 8/1996 | Richert et al. |
| 5,551,350 A | | 9/1996 | Yamada et al. |
| 5,619,078 A | | 4/1997 | Boys et al. |
| 5,722,326 A | | 3/1998 | Post |
| 5,775,227 A | | 7/1998 | Mullen |
| 5,797,330 A | | 8/1998 | Li |
| 5,845,583 A | | 12/1998 | Jensen |
| 5,847,480 A | | 12/1998 | Post |
| 5,855,261 A | | 1/1999 | Odachi et al. |
| 6,039,135 A | | 3/2000 | Henderson |
| 6,089,512 A | | 7/2000 | Ansorge et al. |
| 6,129,025 A | | 10/2000 | Minakami et al. |
| 6,198,993 B1 | * | 3/2001 | Higashi et al. ............. 104/292 |
| 6,250,230 B1 | | 6/2001 | Post |

* cited by examiner

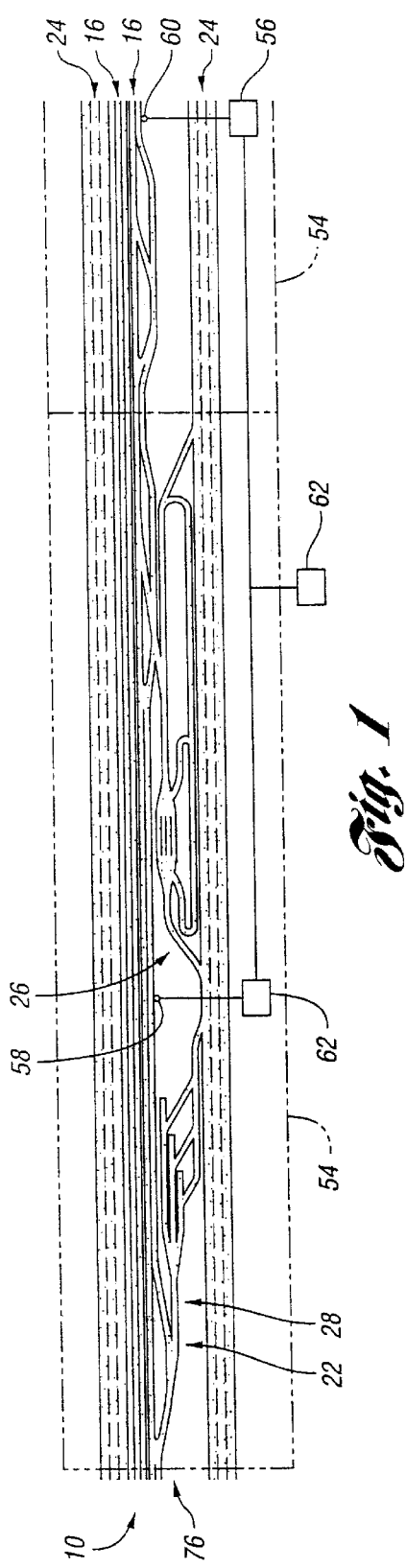
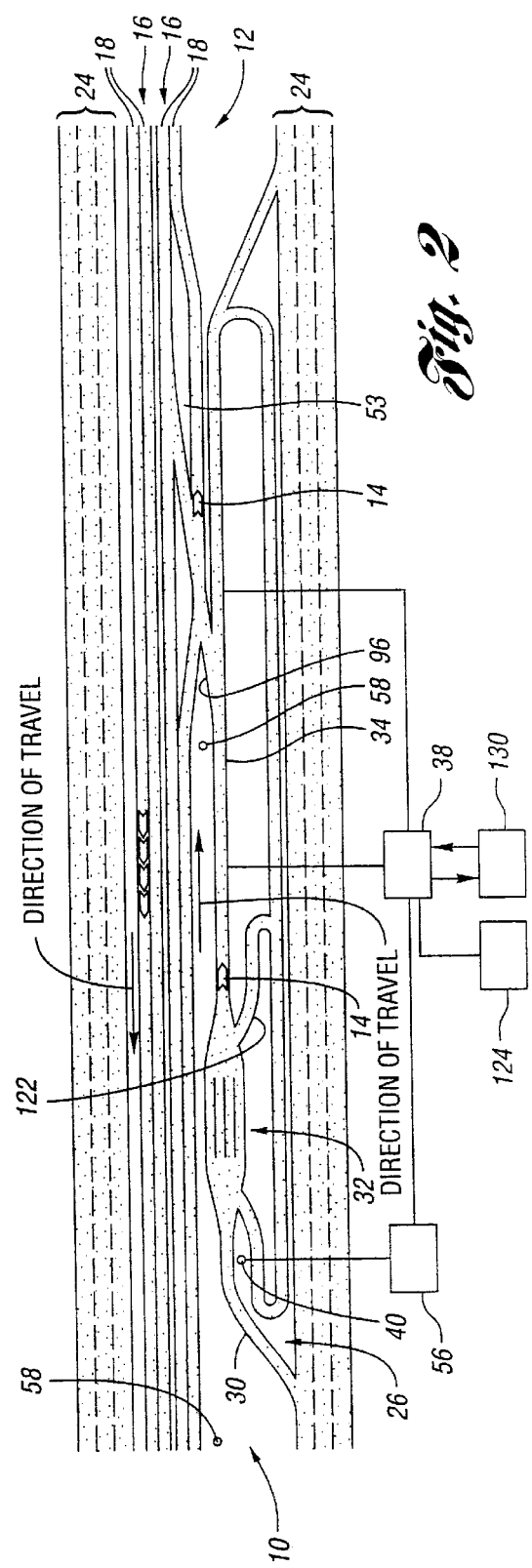

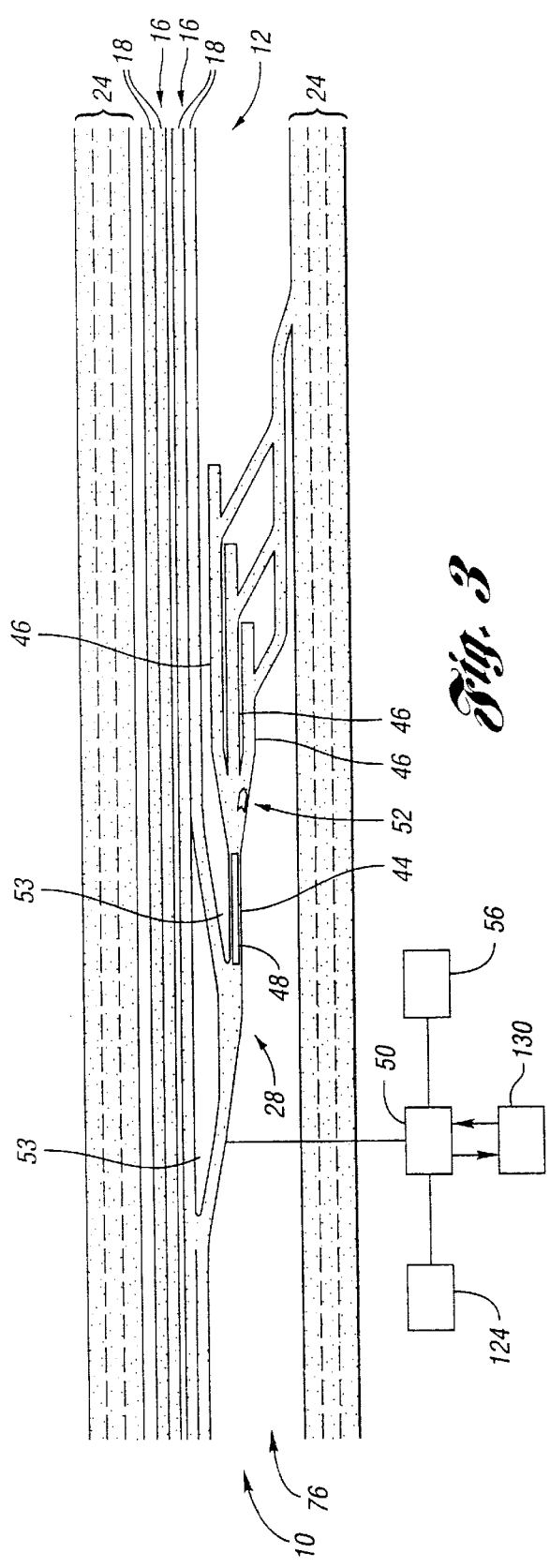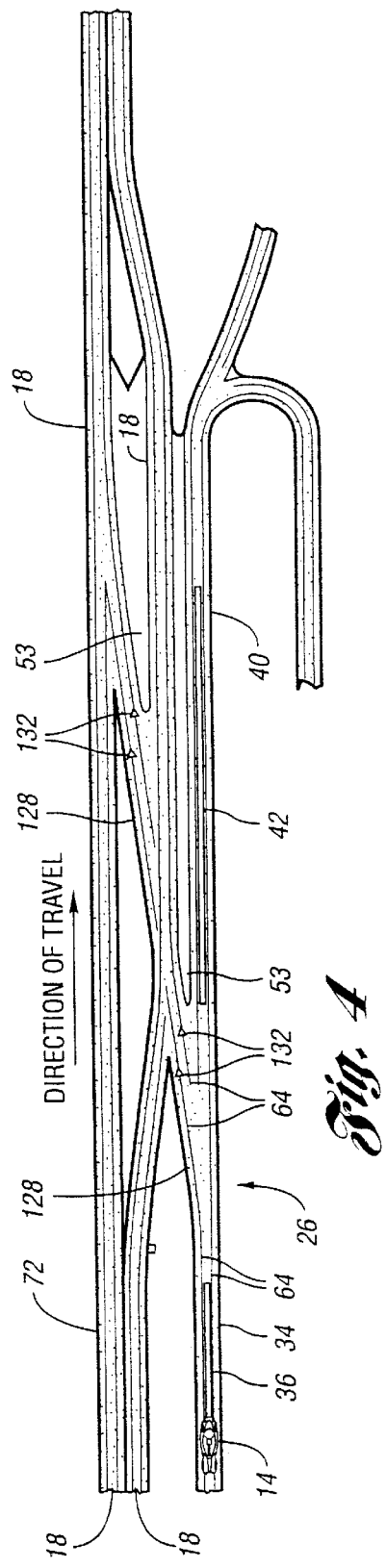

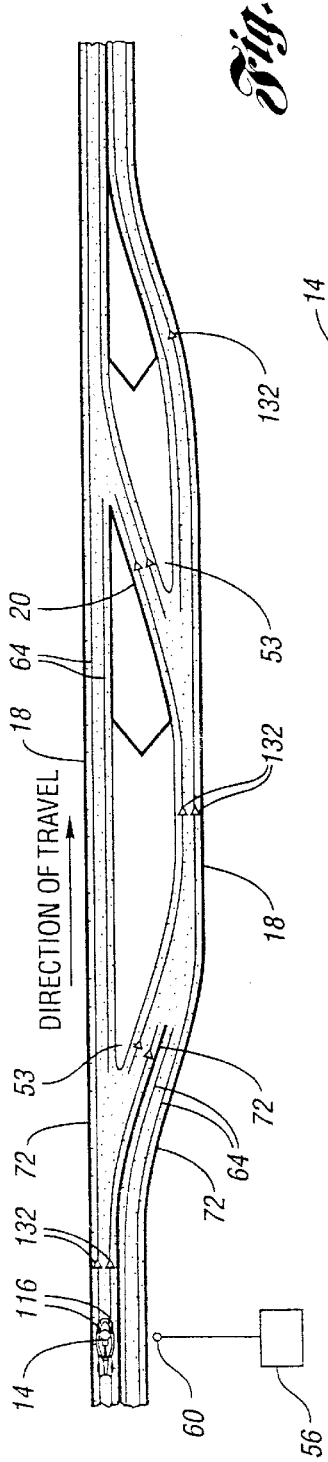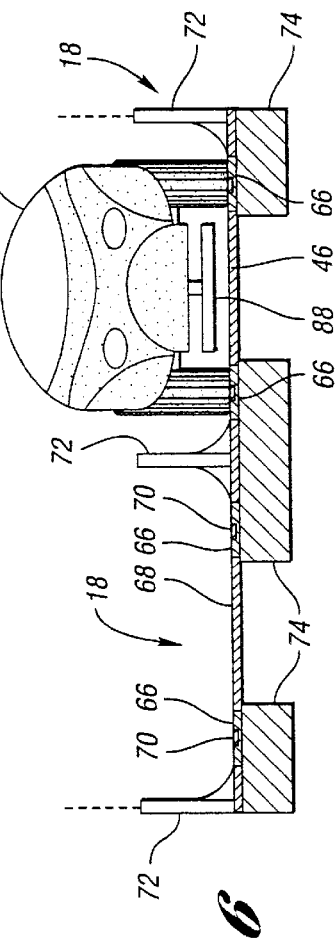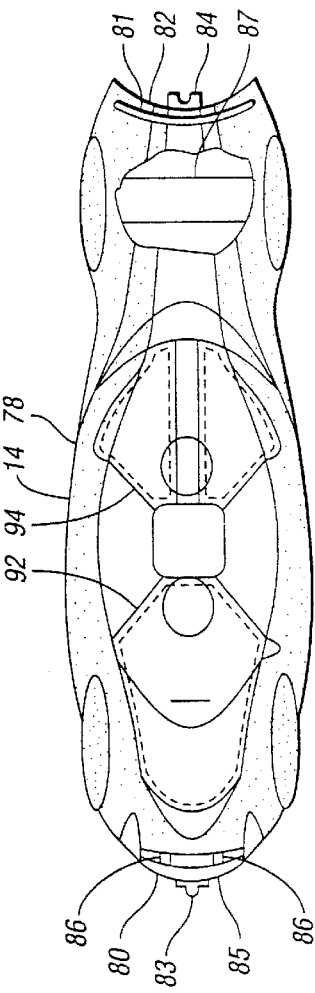

METHOD FOR ACHIEVING AND MAINTAINING DESIRED SPEED ON A GUIDEWAY SYSTEM

BACKGROUND OF INVENTION

1. Field of the Invention

The invention relates to a method for achieving and maintaining a desired speed for a vehicle on a guideway system.

2. Background Art

Several automated transportation systems have been proposed for transporting motor vehicles. U.S. Pat. No. 6,129,025, for example, discloses a transportation system including a plurality of pallets that are propelled on a roadway system using linear induction motors, and each pallet may be used to carry a motor vehicle or container. Furthermore, each pallet has a fin that is inserted into a groove in the roadway system for securing the pallets to the roadway system and for inhibiting lane deviation. Motor vehicles equipped with a linear induction motor element and a fin may also travel on the roadway system.

Because linear induction motors are used to propel pallets and/or motor vehicles along the entire roadway system, linear induction motor elements must be installed along the entire length of the roadway system. Consequently, such a roadway system is costly to construct. Furthermore, power plants capable of supplying continuous power to the linear induction motor elements may also be required, thereby further increasing construction costs as well as operating costs.

SUMMARY OF INVENTION

The present invention addresses the shortcomings of the prior art by providing an improved method of propelling a vehicle on an automated roadway system or guideway system. The method involves utilizing one or more linear induction motors to accelerate the vehicle, and providing speed instructions to the vehicle so as to cause the vehicle to use an alternate power source to maintain a desired cruising speed on the guideway system.

More specifically, a method is provided for controlling operation of a vehicle on a guideway system, wherein the vehicle includes a first element of a linear induction motor and an alternate power source, and the guideway system has an acceleration section including a second element of the linear induction motor, and a computer control system. The method includes utilizing the second element in cooperation with the first element so as to accelerate the vehicle on the acceleration section of the guideway system; and providing speed instructions to the vehicle using the computer control system so as to cause the vehicle to use the alternate power source to maintain a desired cruising speed on a main section of the guideway system.

Because the alternate power source of the vehicle is used to maintain the desired cruising speed along the main section of the guideway system, construction and operating costs of the guideway system may be reduced compared with prior automated transportation systems. Furthermore, because the linear induction motor may be used to partially or fully accelerate the vehicle on the guideway system, the alternate power source of the vehicle may be appropriately sized to efficiently maintain the desired cruising speed on the main section of the guideway system.

These and other objects, features and advantages of the invention are readily apparent from the following detailed description of the preferred embodiments for carrying out the invention when taken in conjunction with the accompanying drawings.

BRIEF DESCRIPTION DRAWINGS

FIG. 1 is a schematic view of a transportation system according to the invention, including a guideway system having one or more guideway lanes;

FIG. 2 is a schematic view of a guideway entrance of the guideway system;

FIG. 3 is a schematic view of a guideway exit of the guideway system;

FIG. 4 is an enlarged view of a portion of the guideway entrance of FIG. 2 showing guidance paths of the guideway entrance;

FIG. 5 is a schematic view of two guideway lanes of the guideway system, and cross-over lanes extending between the guideway lanes;

FIG. 6 is a schematic cross-sectional view of two guideway lanes of the guideway system;

Figure 8:
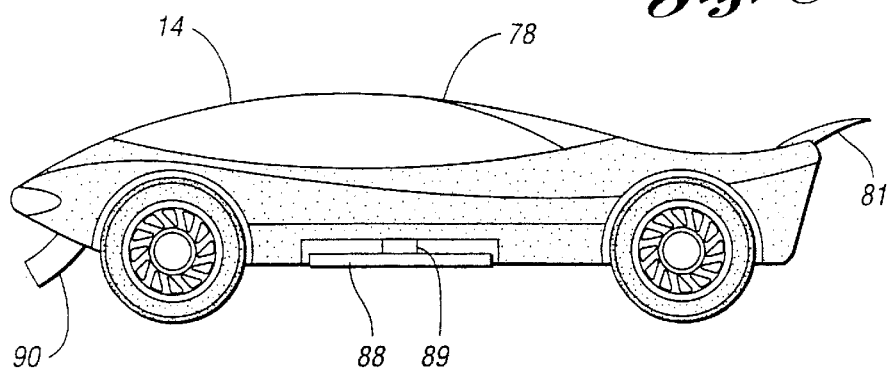
Figure 9:
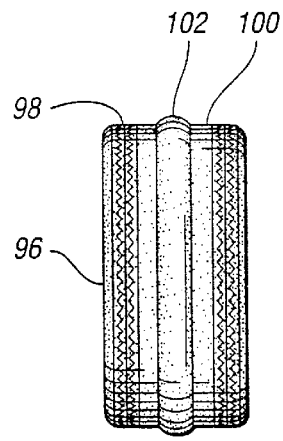
Figure 10:
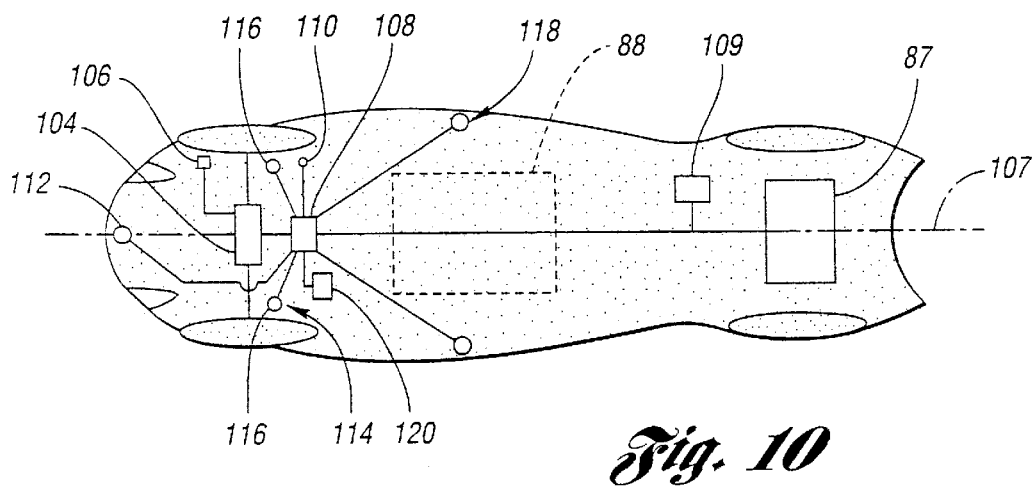
Figure 11:
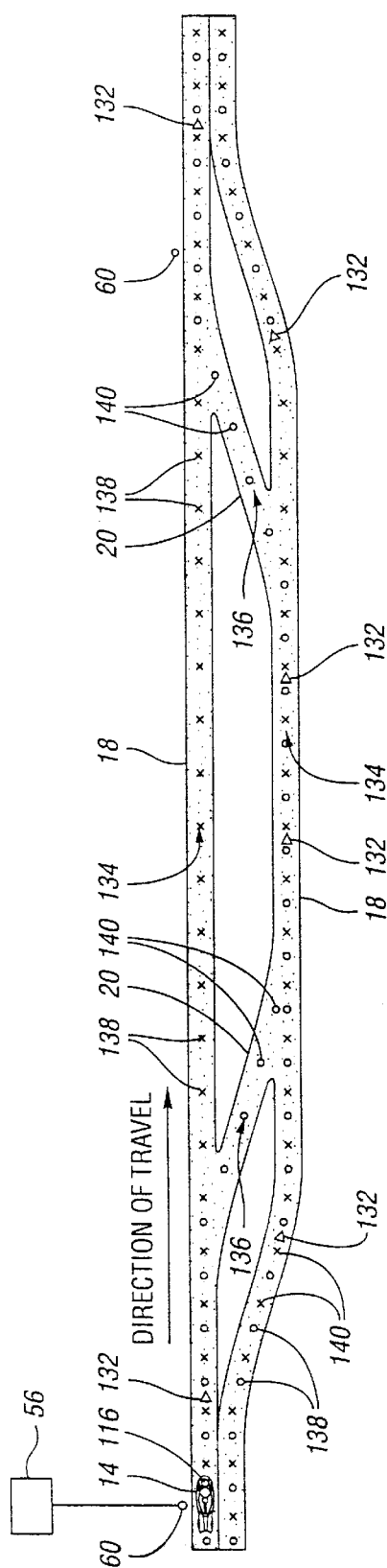
Figure 12:
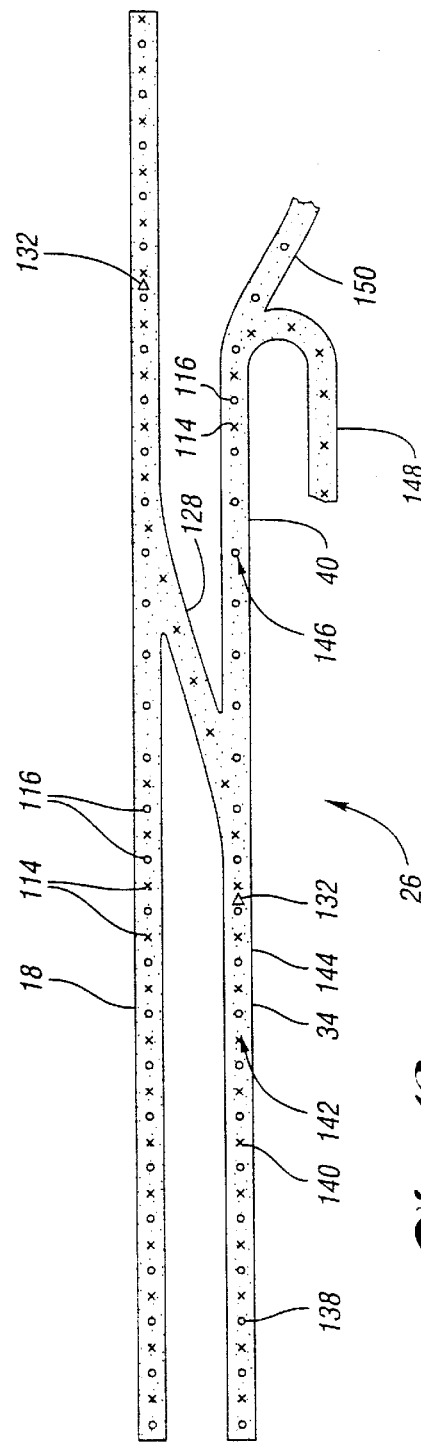
Figure 13:
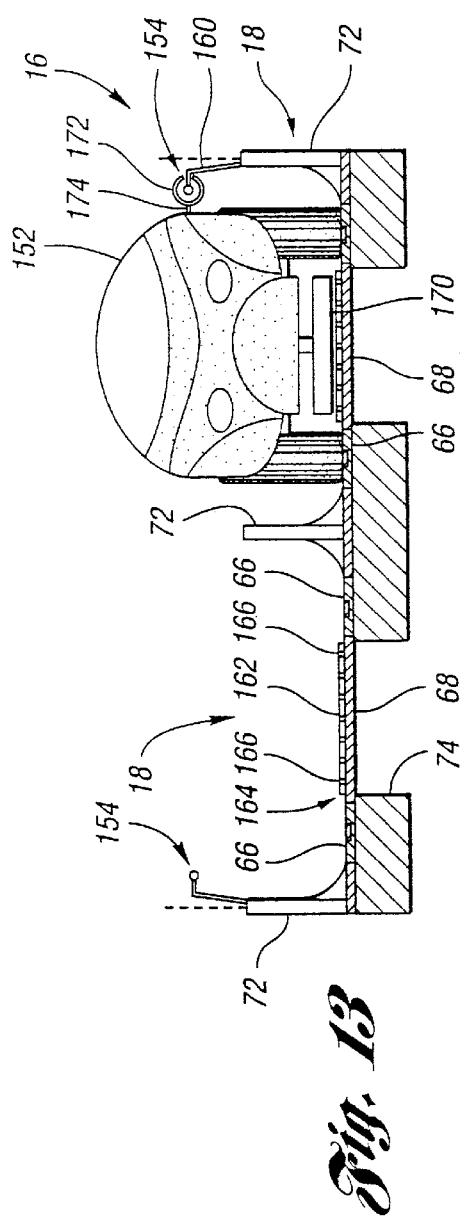
Figure 14:
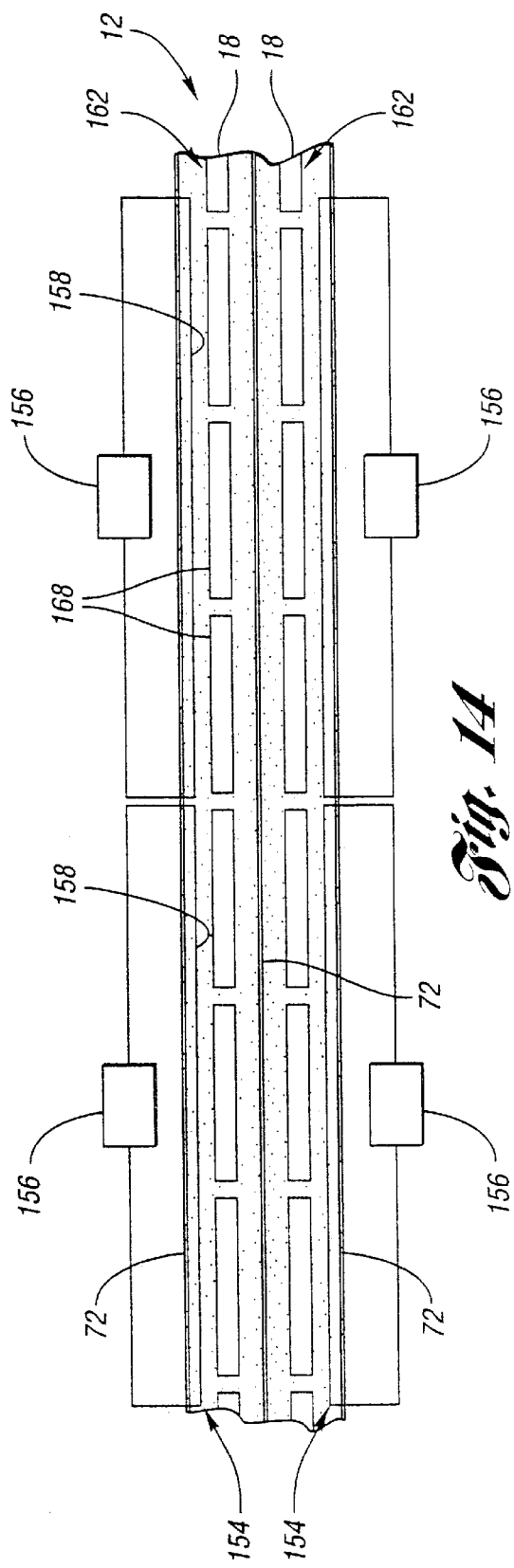
Figure 15:
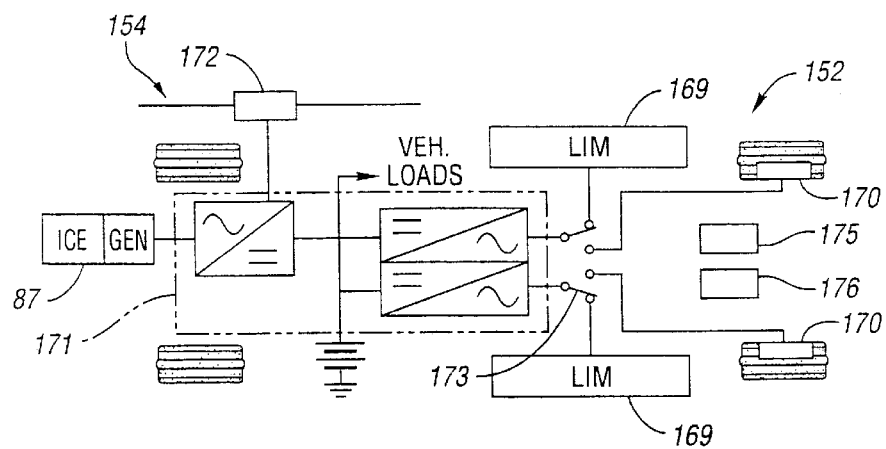
Figure 16:
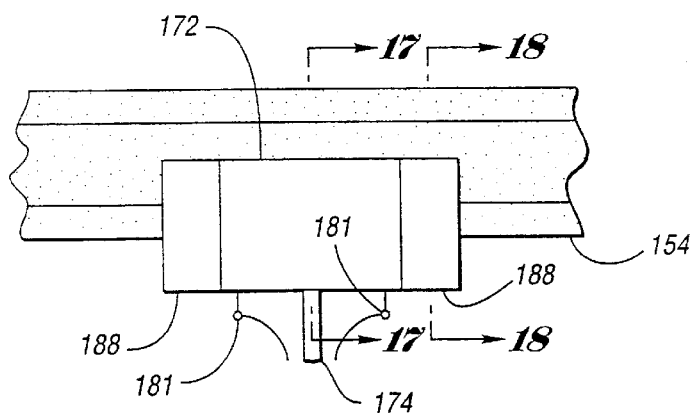
Figures 17, 18:
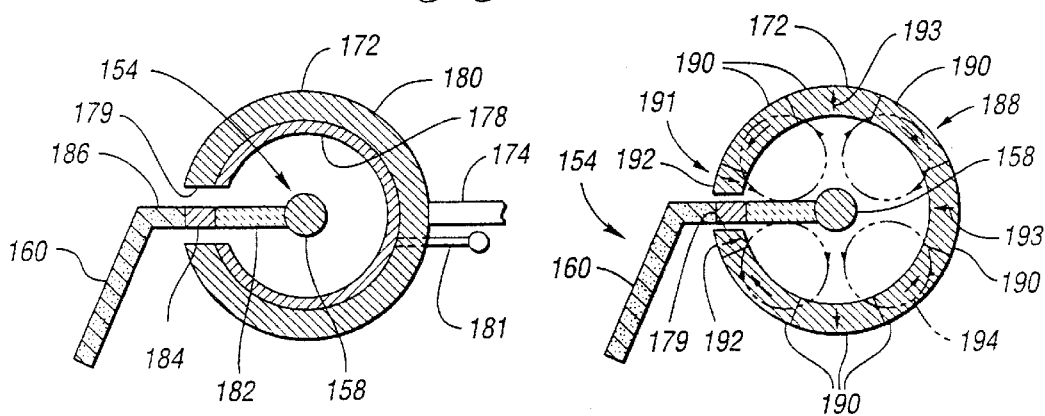
Figure 19:
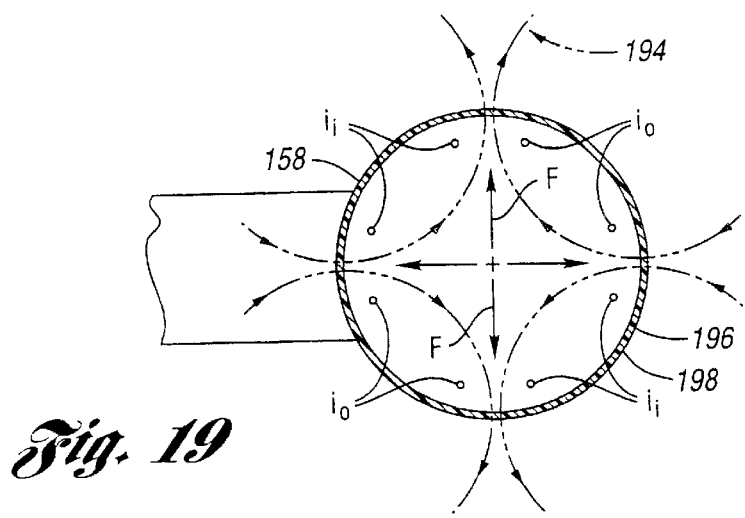
Figure 20:
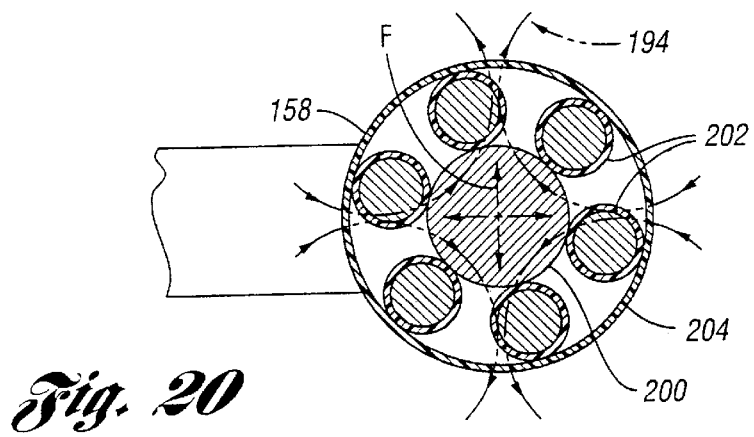
Figure 21:
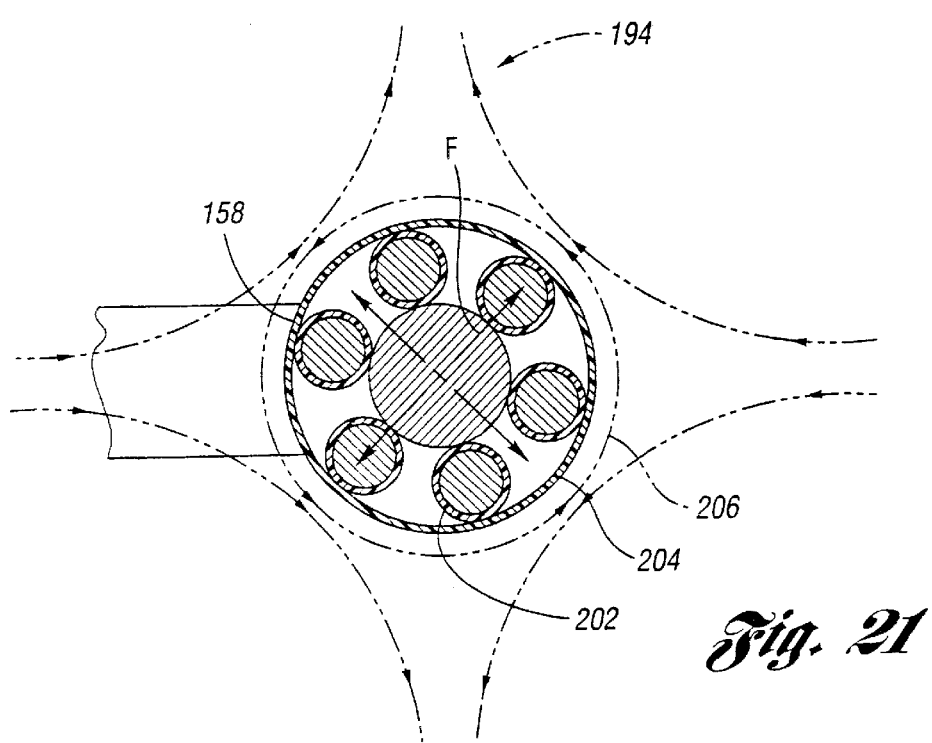

FIG. 7 a plan view of a vehicle of the transportation system for use on the guideway system;

FIG. 8 is a side view of the vehicle of FIG. 7;

FIG. 9 is a front view of a tire for use with a vehicle of the transportation system;

FIG. 10 is a schematic plan view of a vehicle of the transportation system;

FIG. 11 is a schematic view of guideway lanes and cross-over lanes of the guideway system, showing alternate embodiments of guidance paths of the guideway system;

FIG. 12 is a schematic view of a portion of a guideway entrance of the guideway system showing alternative embodiments of guidance paths of the guideway entrance;

FIG. 13 is a schematic cross-sectional view of the guideway system showing additional features of the guideway system, such as power cable assemblies for providing power to vehicles on the guideway system;

FIG. 14 is a schematic view of a portion of the guideway system showing a plurality of power generators connected to cable segments of the power cable assemblies;

FIG. 15 is a schematic view of a vehicle of the transportation system, wherein the vehicle has a transformer for receiving power from the power cable assemblies;

FIG. 16 is a top view of the transformer and a power cable assembly, which includes a plurality of cable segments;

FIG. 17 is a cross-sectional view of the transformer of FIG. 16 taken along line 17—17 and viewed in the direction of the arrows;

FIG. 18 is a cross-sectional view of the transformer of FIG. 16 taken along line 18—18 and viewed in the direction of the arrows;

FIG. 19 is an enlarged view of a portion of FIG. 18 showing a first embodiment of one cable segment;

FIG. 20 is an enlarged view of a portion of FIG. 18 showing a second embodiment of the cable segment; and FIG. 21 is an enlarged view of a portion of FIG. 18 showing a third embodiment of the cable segment.

DETAILED DESCRIPTION

FIGS. 1 through 3 show an automated transportation system 10 according to the invention. The transportation system 10 includes a guideway system 12 and a plurality of motor vehicles 14 configured to travel on the guideway system 12. The guideway system 12 includes one or more guideways 16 for transporting vehicles 14 in a particular direction. Each guideway 16 may include one or more main sections such as guideway lanes 18. Each guideway 16 also includes, at periodic intervals, crossover sections such as crossover lanes 20 extending between two guideway lanes 18, and terminals 22 for connecting the guideway lanes 18 to conventional roads 24, such as highways, surface streets, etc.

Each terminal 22 may include, for example, a guideway entrance 26 and/or a guideway exit 28. Each guideway entrance 26 includes one or more entrance lanes 30 extending from one or more roads 24, and an inspection station 32 for receiving vehicles 14 from the entrance lanes 30. At each inspection station 32, vehicles 14 may be automatically inspected, as explained below in greater detail, to ensure that the vehicles 14 are suitable for travel on the guideway system 12.

Each guideway entrance 26 also includes an acceleration section such as an acceleration lane 34 extending between a particular inspection station 32 and one or more guideway lanes 18. Each acceleration lane 34 may include one or more elements of a linear induction motor for accelerating vehicles 14, as explained below in detail. In the embodiment shown in FIG. 2, for example, the acceleration lane 34 includes an active primary element 36 of a linear induction motor. The primary element 36 may include, for example, an iron or amorphous steel core wound with copper wire in a three-phase configuration, thereby forming windings. The primary element 36 may also be electrically connected to a linear induction motor control system 38, which controls operation of the primary element 36 as explained below in detail.

Each guideway entrance 26 may also include an aborted merge deceleration section or lane 40 extending from an acceleration lane 34 for receiving vehicles 14 that are not able to merge onto a guideway lane 18. Each aborted merge deceleration lane 40 may be provided with one or more elements of a linear induction motor for decelerating vehicles 14, as explained below in detail. For example, in the embodiment shown in FIG. 2, the aborted merge deceleration lane 40 includes an active primary element 42 of a linear induction motor, and the primary element 42 is also electrically connected to the linear induction motor control system 38 of the guideway entrance 26.

Referring to FIG. 3, each guideway exit 28 includes one or more deceleration sections such as deceleration lanes 44 disposed between a guideway lane 18 and one or more exit lanes 46. Each deceleration lane 44 may be provided with one or more elements of a linear induction motor for decelerating vehicles 14, as explained below in detail. For example, in the embodiment shown in FIG. 3, the deceleration lane 44 includes an active primary element 48 of a linear induction motor, and the primary element 48 is electrically connected to a linear induction motor control system 50 of the guideway exit 28.

Each guideway exit 28 may also include an inspection station 52 disposed between one or more deceleration lanes 44 and one or more exit lanes 46. At each inspection station 52, vehicles 14 may be automatically inspected to ensure that the vehicles 14 are suitable for travel on roads 24.

The exit lanes 46 preferably extend to one or more roads 24. As shown in FIG. 3, for example, the exit lanes 46 may merge together before connecting to a road 24.

At any point where two lanes 18, 20, 34, 40 and 44 diverge from each other, each guideway 16 may also include an errant vehicle capture area 53. Such capture areas 53 are configured to absorb kinetic energy from vehicles 14 that have strayed off a particular lane 18, 20, 34, 40 or 44 so as to slow the vehicles 14. The capture areas 53 may include any suitable material that is arranged in any suitable configuration. For example, the capture areas may include energy absorbing foam bumpers.

Referring to FIG. 1, each guideway 16 is divided along its length into control cells 54 whose boundaries may be defined by crossover lanes 20 and/or terminals 22. For example, a cell 54 may begin just before one guideway exit 28, and end just before a crossover lane 20. As another example, a cell 54 may begin just before one crossover lane 20, and end just before another crossover lane 20. As yet another example, a cell 54 may include one or more crossover lanes 20 and/or one or more terminals 22. Alternatively, boundaries of the cells 54 may be based on predetermined lengths or other characteristics of the guideway system 12.

Each cell 54 has a computer control system for monitoring and controlling traffic flow within the control cell 54. The computer control system may include, for example, one or more cell computers such as cell controllers 56. In the embodiment shown in FIG. 1, each cell 54 includes one cell controller 56, and the cell controllers 56 are in communication with each other for exchanging information with each other. Alternatively, one or more computers or controllers may monitor and control traffic flow within multiple cells.

Each cell controller 56 determines which guideway lane or lanes 18 traffic will be routed to upon entering the corresponding cell 54, and each cell controller 56 responds to any emergencies within boundaries of the corresponding cell 54. Traffic is normally contained in one guideway lane 18 only of a particular cell 54, though the particular guideway lane 18 in use may vary from one cell 54 to the next cell 54, depending upon such circumstances as ongoing maintenance and/or blockage of a guideway lane 18 by an inoperative vehicle 14. Traffic may, however, travel on more than one guideway lane 18 within a particular cell 54. For example, if the capacity of a single guideway lane 18 is exceeded, traffic may be divided between two or more guideway lanes 18. Furthermore, if a cell 54 contains a terminal 22, the corresponding cell controller 56 controls merging and/or diverging of entering and/or exiting vehicles 14.

Each cell 54 may also include one or more sensors 58 in communication with the cell controllers 56 for monitoring traffic flow and for providing input to the cell controllers 56. Furthermore, each cell 54 may include one or more communication devices, such as radio transceivers 60, for allowing the cell controllers 56 to communicate with the vehicles 14, as explained below in detail.

The guideway system 12 may also include one or more central controllers 62 that are in communication with the cell controllers 56.

Each guideway 16 may further include one or more guidance paths that are used to control steering of vehicles 14, as explained below in detail. In the embodiment shown in FIGS. 4 and 5, for example, each guideway lane 18, crossover lane 20, acceleration lane 34 and aborted merge deceleration lane 40 is provided with two separate, redundant guidance paths 64. Similarly, each deceleration lane 44 of the guideway exits 28 may also be provided with two separate, redundant guidance paths 64. One of the guidance paths 64 may also be interrupted proximate to junctions of the lanes 18, 20, 34, 40 and 44. Each guidance path 64 may have any suitable configuration and comprise any suitable material. For example, each guidance path 64 may be a continuous strip of metal, wire or paint. As another example, each guidance path 64 may include a plurality of separate guidance elements arranged in a line.

In one embodiment of the invention, each guideway 16 is of lightweight construction. For example, as shown in FIG. 6, each guideway lane 18 may include two narrow tire strips 66, which support tires of the vehicles 14, and an open gridwork 68 disposed in a gap between the tire strips 66. Alternatively, as another example, the gap between the tire stripe 66 may remain as open space.

The tire strips 66 may be made of any suitable material such as concrete. Each tire strip 66 may also include one or more of the guidance paths 64 described above in detail. Furthermore, each tire strip 66 may include a heating element 70 for heating the tire strip 66 to thereby remove snow and ice, or to dry the tire strip 66 after a rain event. Each heating element 70 may be any suitable type of heating element, such as an electric element, hot water or steam tube, etc.

Each guideway lane 18 may also include curved, vertically extending side walls 72 that define outer boundaries of the guideway lane 18. One of the walls 72 is eliminated, however, at locations where a particular guideway lane 18 joins a crossover lane 20, acceleration lane 34, or deceleration lane 40 and 44. At locations where walls 72 are eliminated, the guideway system 12 may be provided with capture areas 53 described above in detail. The walls 72 are shaped such that if tires of a vehicle 14 contact a wall 72, the wall 72 will guide the vehicle 14 back to the center of a particular guideway lane 18. In addition the walls 72 serve to keep out pedestrians, animals, and debris.

The guideway lanes 18 may be supported by small pilings 74 that raise the guideway lanes 18 sufficiently off the ground so that water can run off the tire strips 66 without accumulating on the guideway lanes 18. With such a configuration, snow may also be easily cleared such as by using automated vehicles having plows or snow throwers attached thereto. Alternatively, the guideway lanes 18 may be at ground level, with drainage provided in the area between the tire strips 66.

Advantageously, the guideways 16 may be located along primary and/or secondary highways. Depending upon the construction of such highways, the guideways 16 may occupy buffer areas on the sides of highways and/or central medians of divided highways. In the embodiment shown in FIGS. 1 through 3, the guideways 16 are positioned in a central median 76. The guideways 16 may even be fastened to vertical walls of sub-surface highways in, for example, urban areas. Another possible location for the guideways 16 is along abandoned railways.

The width of each guideway 16 may be minimized, so as to ease placement in congested areas. For example, the total width of the guideway 16 shown in FIG. 6 may be about 3.7 m (12.1 feet), i.e., the width of a single expressway lane. In areas where cross streets or lack of space makes a ground or near-ground level installation infeasible, each guideway 16 may be elevated sufficiently to allow vehicle traffic to pass beneath the guideways 16. Alternatively, the guideways 16 may include guideway lanes having any suitable configuration and comprising any suitable materials.

Referring to FIGS. 7 and 8, details of the vehicles 14 will now be provided. While the vehicles 14 may have any suitable configuration, each vehicle 14 preferably has a streamlined, narrow body 78. For example, the width of the body 78 may be in the range of 120 to 150 cm. Such a configuration provides superior aerodynamic characteristics, and also enables each vehicle 14 to be used on a guideway lane 18 having a narrow configuration. Each vehicle 14 may also have one or more permanent or deployable shrouds, such as shroud 81, and/or curved front and rear ends 80 and 82, respectively, to enhance streamlining when multiple vehicles 14 travel in a closely spaced arrangement, which may be referred to as a platoon. Shroud 81 is shown in a stowed position in FIG. 7 and a deployed position in FIG. 8.

Magnetic or mechanical coupling devices may also be provided at front and rear ends 80 and 82, respectively, of each vehicle 14 for physically locking together multiple vehicles 14 to form a platoon. For example, each vehicle 14 may be provided with a movable coupling device 83 at the front end 80, and a mating fixed coupling device 84 at the rear end 82. Furthermore, the coupling device 83 may be mounted on a movable portion of the body 78, such as front bumper 85, which may be connected to a main portion of the body 78 with extendible dampers 86, such as hydraulic dampers. Such dampers 86 serve to absorb the shock of contact when a following vehicle 14 approaches and couples to a leading vehicle 14. The bumpers 85 and dampers 86 can also be extended during operation on conventional roads 24 so as to absorb energy in the event of a frontal collision. The coupling device 83 may be attached to a fixed portion of the body 78, such as a rear bumper or vehicle frame.

Each vehicle 14 also includes an alternate power source 87, which is supported by body 78, for propelling the vehicle 14 along roads 24 and/or along the guideway lanes 18, as explained below in detail. The power source 87 may be, for example, an internal combustion engine, an electric motor, fuel cell, or any other suitable power source. Each vehicle 14 further includes a primary or secondary element of a linear induction motor. In the embodiment shown in FIG. 8, the vehicle 14 includes a secondary element 88 of a linear induction motor, and the secondary element 88 is supported by a spring actuator 89 that is attached to the body 78. Alternatively, the secondary element 88 may be fixed to the body 78 or otherwise supported by the body 78. While the secondary element 88 may have any suitable configuration, in the embodiment shown in FIG. 8, the secondary element 88 is a thin, iron-backed aluminum reaction plate.

Each vehicle 14 may also be provided with an air scoop 90 for drawing air upwardly through the gridwork 68 and/or gap between the tire strips 66 of the guideway 12. Advantageously, air collected by the air scoop 90 may be used to cool the power source 87 and/or other components of the vehicle 14.

In the embodiment shown in FIG. 7, the vehicle 14 has front and rear seats 92 and 94, respectively. The front seat 92 is rotatable so that when the vehicle 14 is on the guideway system 12, two occupants can face each other, or so that the front occupant may work at a mobile office.

Each vehicle 14 is also preferably relatively light, having a mass in the range of about 600 to 900 kg. Alternatively, the vehicles 14 may have any suitable mass.

While the vehicles 14 may include any suitable tires, each vehicle 14 may include dual-mode pneumatic tires 96, an example of which is shown in FIG. 9. Each tire 96 has three or more air chambers, such as inner and outer chambers, 98 and 100, respectively, and a center chamber 102 disposed between the inner and outer chambers 98 and 100, respectively. During guideway operation, the center chamber 102 is inflated to a higher pressure than the inner and outer chambers 98 and 100, respectively, thereby providing precise handling and efficient operation on the smooth, straight guideway lanes 18. The other two chambers 98 and 100 provide redundancy in case of failure of the center chamber 102. When operated on conventional roads, the pressure in the center chamber 102 may be reduced to that of the other two chambers 98 and 100.

Referring to FIG. 10, each vehicle 14 may also include a steering system 104 that is configured to steer the vehicle 14 with electrical signals such that there is no physical connection between a steering wheel of the vehicle 14 and a steering gear. With such a configuration, the steering wheel may be collapsed out of the way to provide more interior space while on the guideway system 12. Each vehicle 14 may also be provided with a mechanical stop 106 that is energized while the vehicle 14 is on the guideway system 12. Such a mechanical stop 106 may inhibit or prevent front wheels of a vehicle 14 from turning more than a small, predetermined angle with respect to a longitudinal axis 107 of the vehicle 14 under any failure mode. This angle, which preferably corresponds to the maximum design steering angle required for the vehicle 14 to navigate curves in the guideway system 12, is typically no more than a few degrees.

Each vehicle 14 is preferably, but not necessarily, capable of full computer-controlled operation while on the guideway system 12. As shown in FIG. 10, each vehicle 14 may be provided with a vehicle computer 108 that is in communication with a power source 87, a steering system 104 and a brake system 109 of the vehicle 14. Each vehicle computer 108 may communicate with the cell controllers 56 so as to control vehicle operation. For example, each vehicle 14 may include a communication device, such as a radio transceiver 110, that is in communication with a respective vehicle computer 108, and is configured to communicate with the radio transceivers 60 of the cells 54 so that the cell controllers 56 can exchange information with the vehicle computers 108. Alternatively, the vehicle computers 108 may communicate with the controllers 56 in any suitable manner.

In addition, each vehicle 14 may be provided with suitable sensors in communication with a corresponding vehicle computer 108 for detecting other vehicles 14 and/or for sensing various features of the guideway system 12. For example, each vehicle 14 may include a forward-looking sensor system 112 and a downward-looking sensor system 114. The forward-looking sensor system 112 includes one or more sensors that are used to sense for the presence of other vehicles on the guideway system 12. The downward-looking sensor system 114 may include, for example, two guidance sensors 116, such as inductive or magnetic sensors, that sense guidance paths 64 of the guideway system 12. Preferably, but not necessarily, the sensors 116 may operate in a null detecting mode so as to provide optimum sensitivity. Output from the sensors 116 of a particular vehicle 14 is provided as input to the vehicle computer 108 of the vehicle 14, and the vehicle computer 108 uses this input to control the steering system 104 of the vehicle 14 so as to track one or both of the guidance paths 64. Each vehicle 14 may also be provided with a transverse-looking sensor system 118 that includes two sensors that monitor the distance to the walls 72 so as to provide additional positional redundancy.

Each vehicle 14 may also be provided with a data recorder 120 that records operation parameters of the vehicle 14 while the vehicle 14 is operating on roads 24 and/or the guideway system 12. For example, a data recorder 120 may monitor and record vertical acceleration events of a particular vehicle 14.

Operation of the transportation system 10 will now be described in detail. Referring to FIGS. 2 and 10, vehicles 14 may enter the guideway system 12 at guideway entrances 26. Prior to entering a particular guideway entrance 26 from a road 24, the driver of a vehicle 14 may use the vehicle computer 108 and radio transceiver 110 to communicate a desired exit point to the cell controller 56 associated with the guideway entrance 26. The cell controller 56 may then check the status of deceleration lanes 44 and/or exit lanes 46 associated with a guideway exit 28 at the desired exit point. If congestion is predicted, based on such factors as the present volume in the deceleration lanes 44 and/or exit lanes 46 at the exit point, destinations of vehicles 14 en route, and traffic on adjoining roads 24 at the exit point, the cell controller 56 may give the driver the choice of (1) entering the guideway system 12 and waiting at the guideway entrance 26 until congestion has decreased or (2) selecting an alternative, non-congested exit point so that the vehicle 14 may be launched onto a guideway lane 18 immediately.

Upon entering the guideway entrance 26, control of the vehicle 14 is passed over to the cell controller 56 at any suitable point, such as prior to the inspection station 32. The vehicle 14 may be then automatically routed to the inspection station 32, where the vehicle 14 is given a safety inspection to verify operation of various systems of the vehicle 14, such as steering system 104, vehicle computer 108, and/or brake system 109. The tires 96 of the vehicle 14 may also be properly inflated at the inspection station 32. The cell controller 56 associated with the guideway entrance 26 may also communicate with the data recorder 120 of the vehicle 14 so as to obtain information about the vehicle 14, as well as operating history. The vehicle 14 may then wait at the inspection station 32 until the cell controller 56 is ready to launch the vehicle 14 onto a guideway lane 18. If a vehicle 14 does not meet requirements for travel on a guideway lane 18, the vehicle 14 may be routed to a failed inspection lane 122. Such a vehicle 14 may then return to the road 24, or return to the entrance of the inspection station 32 to attempt to correct any deficiencies.

For aerodynamic and carrying capacity reasons, vehicles 14 may travel in platoons on the guideway lanes 18. Platoons may have an upper size limit, such as ten vehicles 14, and are preferably separated from one another by large distances, such as 150 m to 300 m. If a platoon that is less than a predetermined maximum size is passing when the vehicle 14 is ready to be launched, the vehicle 14 will be launched at the proper time to join the rear of the platoon. If the passing platoon is at the maximum size, the platoon may split in two and the vehicle 14 may join the rear of the following platoon.

If there is no platoon currently passing, the vehicle 14 may still be launched alone or with other vehicles. The cell controller 56 may also determine time $t_p$ since the previous platoon (leading platoon) passed and time $t_n$ until the next platoon (following platoon) will pass, based on one or more sensors 58 located some distance back of the guideway entrance 26. The cell controller 56 then calculates control parameters $t_p/t_{pc}$ and $t_n/t_{nc}$, where $t_{pc}$ and $t_{nc}$ are threshold times that respectively depend on the lengths of the leading and following platoons, and on the number of vehicles 14 ready to be launched from the guideway entrance 26. If either control parameter is less than 1, the cell controller 56 may provide instructions to one or more vehicles 14 so as to control vehicle speed. For example, if control parameter $t_p/t_{pc}$ is less than 1, the cell controller 56 may instruct the lead vehicle 14 of the leading platoon to slow down. As another example, if control parameter $t_n/t_{nc}$ is less than one, the cell controller 56 may instruct one or more recently launched vehicles 14 to slow down so that the recently launched vehicle(s) 14 may join the follow rig platoon.

Alternatively, vehicles 14 may travel alone or be combined into platoons in any suitable manner. For example, if one or more vehicles 14 leave a particular platoon and exit the guideway system 12, then one or more recently launched vehicles 14 may engage the platoon.

Furthermore, vehicles 14 may enter the guideway system 12 and be launched onto a particular guideway lane 18 without coming to a complete stop before entering the guideway lane 18. Under this scenario, vehicles 14 may be inspected at an inspection station 32 while the vehicles 14 are moving. Alternatively, vehicles 14 may come to a complete stop prior to entering a particular guideway lane 18. For example, a particular vehicle 14 may need to wait until a suitable gap is present to receive the vehicle 14. As another example, a vehicle 14 may need to stop at an inspection station 32 in order to have tires 96 of the vehicle 14 inflated.

Referring to FIGS. 2, 4 and 10, an example launch process will now be described in detail. First, if a particular guideway entrance 26 is configured to launch vehicles onto more than one guideway lane 18, the cell controller 56 associated with the guideway entrance 26 determines onto which guideway lane 18 a particular vehicle 14 will be launched. When the cell controller 56 is ready to launch the vehicle 14 onto a particular guideway lane 18, such as right guideway lane 18 shown in FIG. 4, the cell controller 56 controls operation of the vehicle 14, by providing instructions to the vehicle 14, so as to route the vehicle 14 to an acceleration lane 34. The cell controller 56 may then instruct the vehicle computer 108 to automatically lower the secondary element 86 of the vehicle 14. Alternatively, magnetic attraction between the primary element 36 of the acceleration lane 34 and the secondary element 88 may urge the secondary element 86 toward the primary element 36. As yet another alternative, the primary element 36 may be raised above the tire strips 66 of the acceleration lane 34, so that the primary element 36 will be in close proximity to the secondary element 88. The gap between the secondary element 88 and the primary element 36 is preferably as small as possible, such as 10 to 20 millimeters. Alternatively, the gap between the secondary element 88 and the primary element 36 may be any suitable distance.

Next, the cell controller 56 senses the right guideway lane 18, using one or more sensors 58, for the presence of a suitable gap in traffic flow for receiving the vehicle 14 from the acceleration lane 34. Alternatively, the cell controller 56 may cause vehicles 14 on the right guideway lane to move relative to one another to create a suitable gap. The cell controller 56 then automatically determines when to begin acceleration of the vehicle 14 and at what rate to accelerate the vehicle 14 so that the vehicle 14 will reach a merge point on the right guideway lane 18 at the same time as the gap in traffic flow.

Next, the cell controller 56 may control operation of the power source 87 of the vehicle 14 so as to accelerate the vehicle 14 on the acceleration lane 34. For example, the cell controller 56 may provide acceleration instructions to the vehicle computer 108 so as to cause the vehicle computer 108 to accelerate the vehicle 14 using the power source 84.

The cell controller 56 also energizes the primary element 36, or causes the primary element 36 to be energized, using power from any suitable power source, so as to accelerate the vehicle 14 on the acceleration lane 34. For example, the cell controller 56 may provide instructions to a linear induction motor control system 38 to energize the primary element 36 using power provided by a utility company and/or using power provided by a power generator 124, such as a fuel cell or natural gas power generator, that is part of the transportation system 10.

More specifically, the linear induction motor control system 38 may excite windings of the primary element 36 with current in the proper phase relationship and frequency, so as to generate a traveling magnetic field or wave. When the secondary element 88 is positioned near the primary element 36, eddy currents are generated in the secondary element thereby forming magnetic "image poles". These magnetic poles, opposite in direction to the traveling wave generated by the primary element 36, interact with the current in the windings to provide a repulsive force, which causes the vehicle 14 to move.

The speed of the traveling wave may be adjusted to be slightly greater than the relative speed of the secondary element 88 with respect to the primary element 36. As a result, the magnetic poles induced in the secondary element 88 move forward along the secondary element 88 at a "slip speed", typically 5% of the speed differential between the secondary element 88 and the primary element 36. This results in a net forward thrust on the vehicle 14. Conversely, adjusting the speed of the traveling wave to be slightly less than the speed of the vehicle 14 results in a backward thrust or deceleration. This deceleration approach may be utilized, for example, with the aborted merge deceleration lanes 40 and the deceleration lanes 44.

The primary element 36 may also be energized in sections and/or the acceleration lane 34 may be provided with multiple primary elements 36 that can be sequentially energized. For example, if the primary element 36 includes multiple sections, as the vehicle 14 passes from the end of a first section to the beginning of a second section, the excitation frequency and phase of the second section are adjusted to match that of the first, and the vehicle 14 is accelerated further. As soon as the vehicle 14 passes to the second section, the excitation frequency and phase of the first section are adjusted so that the first section is ready to accelerate another vehicle. At the end of the last section, the vehicle 14 has preferably achieved a speed that is approximately equal to system speed or cruising speed, which is the speed maintained by other vehicles 14 on the right guideway lane 18.

As mentioned above, the secondary element 88 may include an aluminum plate with an iron backing. The iron backing provides a low reluctance return path for the magnetic field, resulting in more efficient operation, and the iron backing counteracts the repulsive force between the two elements 36 and 88. A repulsive force may be undesirable for vehicles 14 that are light, since the repulsive force may tend to urge such vehicles upwardly, thereby destabilizing the vehicles.

After the vehicle 14 has approximately reached cruising speed, cell controller 56 verifies that the expected gap in traffic flow exists at the correct position for the vehicle 14 to merge onto the right guideway lane 18. The cell controller 56 may check for the presence of the gap using a sensor 58 mounted on or near the right guideway lane 18 at an appropriate point, such as a point 126 behind the beginning of merge portion 128 of the acceleration lane 34. In addition, a sensor on board the vehicle 14 may be used to pick up an optical signal or other signal that would be blocked if there were no gap.

If either check fails to verify the gap, the merge is aborted and the vehicle 14 will continue straight into the aborted merge deceleration lane 40, where the vehicle 14 may be decelerated by properly exciting windings of the primary element 42 of the aborted merge deceleration lane 40, as described above in detail. During the deceleration process, the linear induction motor control system 38 may also convert kinetic energy from the vehicle 14 to electrical energy, which may be transferred to an energy storage device, such as a flywheel 130. This energy may then be reused to energize the primary element 36 during another acceleration event.

If the gap is present and if the vehicle 14 will reach the merge point at the same time as the gap, then the cell controller 56 controls or otherwise influences operation, either directly or indirectly, of the steering system 104 of the vehicle 14 so as to route the vehicle 14 to the merge point. For example, referring to FIGS. 3 and 4, the cell controller 56 may instruct the vehicle 14 to follow one of the guidance paths 64, such as left guidance path 64, that leads to the merge portion 128 of the acceleration lane 34, and/or to not follow the other guidance path 64, such as right guidance path 64, that leads to the aborted merge deceleration lane 40. More specifically, the cell controller 56 may instruct the vehicle computer 108 to ignore or otherwise disregard input from right sensor 116, which corresponds to the right guidance path 64. Alternatively, the cell controller 56 may instruct the vehicle computer 108 to temporarily deactivate the right sensor 116. Instructions provided by the cell controller 38 to the vehicle 14 that effect operation of the steering system 104, or otherwise control guidance of the vehicle 14, may be referred to as guidance instructions.

Once the vehicle 14 is on the merge portion 128, the cell controller 56 may provide real time instructions to the vehicle 14 to re-activate or otherwise respond to the right sensor 116 so as to follow the right guidance path 64 of the merge portion 128, which leads to the right guideway lane 18. Furthermore, the cell controller 56 may provide real time instructions to the vehicle 14 to ignore or otherwise disregard input from the left sensor 116. Alternatively, the merge portion 128 may include one or more embedded codes 132 that provide the above instructions to the vehicle 14, or that trigger the vehicle 14 to implement instructions previously received from the cell controller 56.

Once the vehicle 14 has successfully merged onto the right guideway lane 18, cell controller 56 may provide real time instructions to the vehicle 14 to re-activate or otherwise respond to the left sensor 116. Alternatively, the guideway lane 18 or other portion of the guideway system 12 may include one or more embedded codes 132 that provide instructions to the vehicle 14 to re-activate or otherwise respond to the left sensor 116. As yet another alternative, the embedded code or codes 132 may act as triggers for causing the vehicle 14 to implement instructions previously received from the cell controller 56. For example, as part of the launch process, the cell controller 56 may instruct the vehicle computer 108 to re-activate or otherwise respond to a particular sensor 116 after the vehicle 14 senses a particular embedded code or codes 132.

Each embedded code 132 may be disposed in and considered part of one of the guidance paths 64. Furthermore, each embedded code 132 may be, for example, a digital code, numeric code, alphanumeric code, or any other suitable code. An embedded code 132 can be formed, for example, by alternating two types of guidance elements 138 and 140 in a predetermined pattern, or by varying the spacing between successive guidance elements 138 or 140 of a single type.

If, on the other hand, the cell controller 56 desires to merge the vehicle 14 onto left guideway lane 18 shown in FIG. 4, then the vehicle 14 must cross over right guideway lane 18 and continue on merge portion 128 until the vehicle 14 reaches left guideway lane 18. As the vehicle 14 crosses over right lane 18, the vehicle 14 may continue following left guidance path 64 of merge portion 128. As shown in FIG. 4, however, there may be an interruption in left guidance path 64 of merge portion 128. In such a case, the vehicle 14 may be programmed or otherwise instructed to only respond to guidance elements of a guidance path 64 that are spaced a certain distance apart. As a result, by properly spacing guidance elements of the guidance paths 64, the vehicle 14 will disregard any guidance elements of the left guidance path 64 of the right guideway lane 18, and will continue on the merge portion 128. As another example, left guidance path 64 of merge portion 128 may include a first type of guidance elements, left guidance path 64 of right guideway lane 18 may include a second type of guidance elements different than the first type, and the vehicle 14 may be programmed or otherwise instructed to follow only the fist type of guidance elements so that the vehicle 14 will remain on the merge portion 128. After crossing over the right guideway lane 18, the vehicle 14 may be controlled in a similar manner as described above so as to route the vehicle onto the left guideway lane 18.

The cell controller 56 also preferably controls or otherwise influences operation of the power source 87, either directly or indirectly, so as to maintain the desired cruising speed for the vehicle 14 when the vehicle 14 is on a particular guideway lane 18. For example, the cell controller 56 may provide speed instructions to the vehicle computer 108 to maintain the desired cruising speed, or some other speed, and the vehicle computer 108 may then control operation of the power source 87 so as to maintain such speed. While the cruising speed may be established as any suitable speed, in one embodiment of the invention, the cruising speed is at least 240 kilometers per hour. As the vehicle 14 passes to the next cell 54, the cell controller 56 of the next cell 54 may be used to control operation of the vehicle 14.

Guidance of vehicles 14 on the guideway system 12 will now be described in detail. Referring to FIG. 5, as vehicles 14 travel on a particular guideway lane 18, the vehicles 14 track one or both of the guidance paths 64. If there is a need to shift a vehicle 14 from the guideway lane 18 to another guideway lane 18 (e.g., in case of blockage of the guideway lane), a cell controller 56 may be used to provide one or more instructions to the vehicle 14 that are executable upon the vehicle 14 detecting one or more triggers, such as embedded codes 132, of the guideway system 12.

For example, if the cell controller 56 desires to move the vehicle 14, shown in FIG. 5, from the left guideway lane 18 to the right guideway lane 18 at crossover lane 20, the cell controller 56 may provide the vehicle 14 instructions to crossover when the vehicle 14 reaches the crossover lane 20. Such instructions may be referred to as crossover instructions. Normally, in the case of scheduled maintenance of right guideway lane 18 for example, the crossover instructions may be given to the vehicle 14 when the vehicle 14 first enters the guideway system 12, such as at an inspection station 32. Alternatively, in case of an emergency for example, crossover instructions may be transmitted to the vehicle 14, such as through radio transceivers 60, at the time the emergency is detected.

The crossover instructions may include a series of instructions that are executable by vehicle computer 108 of the vehicle 14, or the crossover instructions may include one or more instructions that direct the vehicle 14 to implement one or more other instructions that are pre-programmed into vehicle computer 108. More specifically, the crossover instructions may include the following four instructions: (1) deactivate or otherwise disregard left sensor 116 upon detecting one or more embedded codes 132 located prior to crossover lane 20 leading to right guideway lane 18; (2) reactivate or otherwise respond to left sensor 116 and deactivate or otherwise disregard right sensor 116 upon detecting one or more embedded codes 132 located on the crossover lane 20; (3) reactivate or otherwise respond to right sensor 116 and deactivate or otherwise disregard left sensor 116 upon detecting one or more embedded codes 132 located on right guideway lane 18 just after the crossover lane 20 that leads to right guideway lane 18; and (4) reactivate or otherwise respond to left sensor 116 upon detecting one or more embedded codes 132 located on right guideway lane 18. Alternatively, the crossover instructions may include an instruction or instructions to implement a protocol that includes the above four instructions, for example, and that is preprogrammed into the vehicle computer 108.

Upon executing the first instruction, the vehicle 14 will track right guidance path 64 and pass onto crossover lane 20. Upon executing the second instruction, the vehicle 14 will track left guidance path 64 and travel onto a portion of right guideway lane 18 located between the two crossover lanes 18 shown in FIG. 5. Upon executing the third instruction, the vehicle 14 will track right guidance path 64 so as to remain on right guideway lane 18 and avoid the other crossover lane 20 shown in FIG. 5. Finally, upon executing the fourth instruction, the vehicle 14 will track both guidance paths 64 of the right guideway lane 18.

Alternatively, cell controller 56 may provide real time instructions to vehicle 14, such as through radio transceivers 60, so as to cause the vehicle 14 to track a particular guidance path 64, and thereby route the vehicle 14 to a desired location. For example, cell controller 56 may provide real time instructions to the vehicle 14 to cause the vehicle 14 to disregard a particular sensor 116, or to respond to a particular sensor 116. Under this scenario, embedded codes are not needed to trigger implementation of the instructions.

As yet another alternative, embedded codes 132 of the guideway lanes 18 may be configured to provide instructions to vehicle 14 regarding operation of steering system 104, vehicle computer 108 and/or sensors 116. For example, after vehicle 14 has entered the right guideway lane 18 and has passed the entrance to the crossover lane 20 leading to the left guideway lane 18, an embedded code 132 may instruct the vehicle 14 to activate or otherwise respond to left sensor 116. Similarly, embedded codes 132 may be used to instruct the vehicle 14 to deactivate or otherwise disregard a particular sensor 116.

Guidance of vehicles 14 at guideway exits 28 may be carried out in a similar manner. Furthermore, deceleration of vehicles 14 on the deceleration lanes 44 may be carried out in a similar manner as described above with respect to the aborted merge deceleration lanes 40. Each guideway exit 28 may also include an energy storage device 130, such as a flywheel or battery storage arrangement, for storing energy recovered from the associated deceleration lane or lanes 44. This stored energy may be used to accelerate vehicles 14 on acceleration lanes 34. Alternatively or supplementally, recovered energy may be delivered toga utility company for reuse by other vehicles 14 via bidirectional power converters at power stations of the utility company and/or guideway system 12.

FIG. 11 shows alternative embodiments of the guidance paths, including guideway lane guidance paths 134 and crossover lane guidance paths 136. As shown in FIG. 11, each guideway lane 18 may include a single guidance path 134, and each crossover lane 20 may include a single guidance path 136. Each guidance path 134 may include first and second guidance elements, 138 and 140, respectively, and the first guidance elements 138 may be different than the second guidance elements 140. For example, the first guidance elements 138 may each have a first shape, such as a cross, and the second elements 140 may each have a second shape, such as a circle. As another example, each first guidance element 138 may include a first color, such as red, and each second guidance element 140 may include a second color, such as black. As yet another example, each guidance element 138 and 140 may be a magnet having first and second poles, wherein the first guidance elements 138 are arranged such that the first poles point in a first direction, such as upward, and the second guidance elements 140 are arranged such that the first poles point in a second direction, such as downward. Other examples include providing the first and second guidance elements 138 and 140, respectively, with different magnetic permeability values, electrical conductivity values, and/or magnetic field strengths.

Alternatively, the first and second guidance elements 138 and 140, respectively, may be the same, but the first guidance elements 138 may have different spacing than the second guidance elements 140. For example, the first guidance elements 138 may be spaced one meter apart, and the second guidance elements 140 may be spaced two meters apart.

As yet another alternative, the first and second guidance elements 138 and 140, respectively, may be the same, and the second guidance elements 140 may be positioned between the first guidance elements 138 in such a manner that each vehicle 14 will be able to distinguish between the first and second guidance elements 138 and 140, respectively. For example, assigning an arbitrary reference point on a guideway lane 18 as longitudinal position value 0, a guideway lane guidance path 134 may be provided with first guidance elements 138 located at positions . . . −4 m, −2 m, 0,2 m, 4 m, etc. If a crossover lane guidance path 136 comprising second guidance elements 140 begins to diverge from guideway lane guidance path 134 proximate point 0, the initial second guidance element 140 may be located at position 1 m, with successive second guidance elements 140 located at positions 3 m, 5 m, etc.

Each guidance path 136 may only include either the first guidance elements 138 or the second guidance elements 140 proximate a point of divergence of the crossover lane 20 from a guideway lane 18. Preferably, but not necessarily, each crossover lane 20 only includes either the first guidance elements 138 or the second guidance elements 140 along the entire length of the crossover lane 20. In the embodiment shown in FIG. 11, for example, each guidance path 136 of the crossover lanes 20 includes only the first guidance elements 138.

With the configuration described above, each vehicle 14 may be provided with a single downward-looking sensor 116, or other suitable sensor, that can sense both the first and second guidance elements 138 and 140, respectively. If the guidance elements 138 and 140 are the same, the sensor 116 in conjunction with a vehicle computer, such as vehicle computer 108, should be able to distinguish between the guidance elements 138 and 140 based on spacing of the guidance elements 138 and 140. Alternatively, each vehicle 14 may be provided with two sensors, one that senses first guidance elements 138, and one that senses second guidance elements 140.

A cell controller 56 may then be used to provide instructions, such as crossover instructions, to a particular vehicle 14 to follow the first and/or second guidance elements 138 and 140, respectively, to thereby control guidance of the vehicle 14. For example, if the cell controller 56 desires to shift the vehicle 14 from left guideway lane 18 to right guideway lane 18, the cell controller 56 may provide crossover instructions to the vehicle computer 108 of vehicle 14, at a point prior to the crossover lane 20 that leads to the right guideway lane 18, so as to cause the vehicle 14 to disregard the first guidance elements 138 and follow only the second guidance elements 140. Such crossover instructions may be provided in real time, through the radio transceivers 60 for example, or the crossover instructions may be provided in such a manner that their implementation is conditioned on the vehicle 14 detecting one or more triggers, such as embedded codes 132, of the guideway system 12.

Referring to FIG. 11, a more detailed example of crossover instructions for shifting the vehicle 14 from the left guideway lane 18 to the right guideway lane 18 will now be provided. As described above, the crossover instructions may include a series of instructions that are executable by vehicle computer 108 of the vehicle 14. More specifically, the crossover instructions may include, for example, the following two instructions: (1) follow second guidance elements 140 upon detecting the embedded code 132 located prior to crossover lane 20 leading to right guideway lane 18; and (2) follow first guidance elements 138 upon detecting the embedded code 132 located on right guideway lane 18 just after the crossover lane 20 that leads to right guideway lane 18.

Alternatively, the crossover instructions may include one or more instructions that direct the vehicle 14 to implement one or more other instructions that are pre-programmed into vehicle computer 108. For example, the crossover instructions may include an instruction or instructions that direct the vehicle 14 to implement a protocol that includes the above two instructions, and that is pre-programmed into the vehicle computer 108.

The embedded codes 132 may also directly provide guidance instructions to the vehicle 14. For example, after the vehicle 14 has merged onto the right guideway lane 18 shown in FIG. 11, and has passed the crossover lane 20 that leads back to the left crossover lane 20, an embedded code 132 of right guideway lane 18 may instruct the vehicle to follow both guidance elements 138 and 140.

Similarly, as shown in FIG. 12, each acceleration lane 34 may include an acceleration lane guidance path 142 having first and second guidance elements 138 and 140, respectively. The merge portion 128 of each acceleration lane 34, however, may only include either first guidance elements 138 or second guidance elements 140 proximate to a main portion 144 of the respective acceleration lane 34. Furthermore, each aborted merge deceleration lane 40 may include an aborted merge deceleration lane guidance path 146 having either first guidance elements 138 or second guidance elements 140 proximate a corresponding acceleration lane 34. The guidance path 146 shown in FIG. 12 also includes both guidance elements 138 and 140 starting at a point spaced away from the acceleration lane 34, so that the guidance path 146 may be used to direct a vehicle 14 onto a return lane 148, which leads back to an inspection station 32, or a road re-entry lane 150, which leads to a road 24.

The deceleration lanes 44 and other lanes of the guideway exits 28 may also include suitable guidance paths that are configured in a similar manner as described above, so that vehicles 14 may be effectively routed off guideway lanes 18.

Referring to FIGS. 13 and 14, the guideway system 12 may also be configured to provide continuous propulsion to vehicles 152 traveling on the guideway lanes 18, as well as other sections of the guideway system 12. For example, each guideway 16 of the guideway system 12 may include one or more power cable assemblies 154 extending along the guideway lanes 18, and one or more power generators 156 for supplying power to the cable assemblies 130. Each cable assembly 154 may include one or more power cables, such as cable segments 158, and each cable segment 158 may be electrically connected to a particular power generator 156 or a power supply station of a utility company. Each cable segment 158 may have any suitable length, such as seven to ten kilometers, and the length may be based on such factors as power density and charging losses associated with the cable segments 158. Each cable segment 158 may be rigid or flexible and may comprise any suitable conductive material, such as aluminum, copper, and/or a superconductor. Each cable segment 158 may also include an insulating layer surrounding the conductive material. The cable segments 158 may cooperate to define a continuous power supply along each guideway lane 18, as well as along other sections of each guideway 16, such as acceleration lanes 34. Alternatively, the cable segments 158 may be spaced apart. With such a configuration, the vehicles 152 may operate on stored energy between cable segments 158.

Furthermore, each cable segment 158 may be supported by a support structure 160, which may be attached to a wall 72, for example. While the cable segments 158 are shown extending along sides of the guideway lanes 18, the cable segments 158 may be disposed in any suitable location, such as above or below the guideway lanes 18.

In addition, each guideway lane 18 may include a reaction strip 162 that is supported by the gridwork 68, or otherwise supported between the tire strips 66. Each reaction strip 162 may be spaced away from the tire strips 66 so as to define gaps 164 therebetween. The gaps 164 are configured to allow precipitation to pass through the guideway lanes 18. The tire strips 66 may also be sloped downwardly toward the reaction strips 162 to facilitate drainage. In addition, each reaction strip 162 may include a plurality of holes 166 for allowing precipitation to pass through the reaction strip 162. The gaps 164 and holes 166 also enable air to pass upwardly through the guideway lanes 18 and into an air scoop of each vehicle 152 so as to cool the vehicles 152.

Each reaction strip 162 may include one or more secondary elements of a linear induction motor. For example, each reaction strip 162 may include one or more reaction plates 168. While the reaction plates 168 may comprise any suitable material, in the embodiment shown in FIGS. 13 and 14, each reaction plate 168 includes an aluminum plate and an iron backing fixed to the aluminum plate.

Referring to FIGS. 13 and 15, each vehicle 152 includes one or more linear induction motor primary elements 169, one or more wheel motors 170, a power conditioning and control module 171 to activate the primary elements 169 and/or the wheel motors 170, and one or more transformers 172, such as toroidal wound transformers and/or coaxial winding transformers, for supplying power to the power control module 171. Switches 173, such as mechanical switches or semiconductor switches, may be used to switch power from the primary elements 169 to the wheel motors 170. Each vehicle 152 may also be configured so that power may be provided to the primary elements 169 and the wheel motors 170 at the same time. Each vehicle 152 may also be provided with wheel motors 170 on all four wheels so as to provide four wheel drive when, for example, the vehicle 152 is operated on conventional roads 24. In addition, each vehicle 152 may include the other features described above with respect to the vehicles 14.

Each transformer 172 may be attached to a respective vehicle 152 by a mounting member 174, such as a flexible rod that is configured to allow the transformer 172 to move up and down with respect to a vehicle body of the vehicle 152. Each transformer 172 is movable along a cable assembly 154, and is configured to cooperate with the cable assembly 154 to transfer power to a corresponding power control module 171, as well as other vehicle components and/or systems such as a cabin HVAC system 175 and electronic systems 176. More specifically, as current flows through a particular cable assembly 154, current flow is induced in each transformer 172 passing along the cable assembly 154.

Referring to FIGS. 16 and 17, each transformer 172 includes first and second layers 178 and 180, respectively, that define a longitudinally extending opening, such as slot 179. The first layer 178 may comprise a conductive material, such as copper. The second layer 180 may comprise a magnetic material, such as powdered iron and/or iron laminates. Each transformer 172 also includes two electrical connecting members 181, such as tabs, that extend from the first layer 178 and that are in electrical communication with the power control module 171. Alternatively, each transformer 172 may have any suitable configuration, such as two conductive layers that sandwich an inner magnetic layer. With such a configuration each transformer 172 may be provided with two electrical connecting members, with each connecting member extending from a particular conductive layer.

As shown in FIG. 17, the support structure 160 of the cable assembly 154 may include a first portion 182 made of an insulating material, such as ceramic, and a second portion 184 that is made of the same or similar materials as the second layers 180 of the transformers 172. The support structure 160 may also include a third portion 186 made of any suitable material, such as concrete, that has sufficient strength to support the cable segments 158. The third portion 186 may also comprise a flexible material, or otherwise be configured to allow each cable segment 158 to move in response to movement of one or more transformers 172 along the cable segments 158.

Referring to FIGS. 16 and 18, each transformer 172 also includes one or more magnetic pole arrays or magnet arrays 188, such as Halbach magnet arrays, that create self shielding magnetic fields for aligning the transformer 172 with respect to a cable segment 158 as the transformer 172 moves along the cable segment 158, such that the cable segment 158 is generally centered with respect to the transformer 172. Thus, each transformer 172 may transfer power to a corresponding vehicle 152 without physically contacting a cable assembly 154.

In the embodiment shown in FIGS. 16 and 18, the transformer 172 includes two magnet arrays 188, with one magnet array 188 disposed at each end of the transformer 172. As shown in FIG. 18, each magnet array 188 may include eight magnets, such as arcuate magnet segments 190 and 191, arranged in a ring. The magnet segment 191 disposed proximate the slot 179 is divided into two portions, such as two halves 192. Each magnet segment 190 and 191 has a magnetization vector 193 that points in the direction of the North pole of the magnet segment 190 or 191. Furthermore, the magnet segments 190 and 191 are arranged so as to create a centering magnetic field 194 that aligns the cable segment 158 and the transformer 172 with respect to each other, such that the cable segment 158 and the transformer are generally centered with respect each other.

Alternatively, each magnet array 188 may include any suitable even number of magnet segments, such as two, four, or six magnet segments, that are arranged in such a manner so as to create a self-shielding, centering magnetic field. Furthermore, if a particular transformer 172 includes two or more magnet arrays 188, the magnet arrays 188 may be oriented differently so as to improve self-centering capabilities of the transformer 172. For example, one magnet array 188 may be rotated 45° with respect to another magnet array 118.

The self-centering effect of the magnet arrays 188 may be achieved or otherwise implemented in a variety of ways. For example, referring to FIG. 19, each cable segment 158 may include a conductive core 196 made of a conductive material, such as aluminum, copper, and/or a superconductor, and the conductive core 196 may be surrounded by an insulation layer 198. As the transformer 172 moves along a particular cable segment 158, the magnetic field 194 created by the magnet arrays 188 may induce eddy currents $i_i$ and $i_o$ in the conductive core 196, and the eddy currents $i_i$ and $i_o$ may exert balanced, radially extending repulsive forces F (in FIG. 19, eddy currents $i_i$ flow into the page, and eddy currents $i_o$ flow out of the page). The magnetic field 194 cooperates with these repulsive forces F so as to center the transformer 172 and the cable segment 158 with respect to each other. It should be noted that in order to achieve such centering or alignment, the transformer 172 may move with respect to the cable segment 158 and/or the cable segment 158 may move with respect to the transformer 172.

As another example, referring to FIG. 20, each cable segment 158 may be provided with a steel core 200, which is surrounded by a plurality of conductors 202 and an insulation layer 204. In a manner similar to that described above, the magnetic field 194 created by the magnet arrays 188 may induce eddy currents in the steel core 200, and the eddy currents may exert balanced, radially extending repulsive forces F. Again, the magnetic field 194 cooperates with these repulsive forces F so as to center the transformer 172 and the cable segment 158 with respect to each other.

As yet another example, referring to FIG. 21, each cable segment 158 may be supplied with high frequency AC current that also includes a DC component. Under this approach, each cable assembly 158 may comprise a plurality of conductors, such as conductors 202, or any of the above configurations. The DC component may create a DC field 206 that exerts repulsive forces F when exposed to the magnetic field 194. Again, the magnetic field 194 of each magnet array 188 cooperates with these repulsive forces F so as to center the transformer 172 and the cable segment 158 with respect to each other. Because the DC field 206 may also exert pairs of attractive forces, the magnet arrays 188 (both leading and trailing magnet arrays 188) of the transformer 172 may be oriented differently so as to improve centering capabilities of the transformer 172. For example, the trailing magnet array 188 may be rotated 90° with respect to the leading magnet array 188.

With any of the configurations described above, each vehicle 152 may be propelled along a guideway 16 by properly energizing or otherwise exciting the vehicle's primary element or elements 169 in a manner similar to that described above with respect to the primary elements 36. The cell controllers 56 of the guideway system 12 may control propulsion of the vehicles 152 by providing vehicle speed instructions to vehicle computers 108. The cell controllers 56 may also control operation of an alternate power source 84 of each vehicle 152, so as to achieve additional propulsion of the vehicles 152 on a guideway 16. Furthermore, guidance of the vehicles 152 may be accomplished in a similar manner as described above for the vehicles 14. The cell controllers 56 may also communicate traffic density information to the power generators 156 and/or utility companies, so that the power generators 156 and/or utility companies can supply power sufficient to match anticipated loading.

Each acceleration lane 34 may also include a reaction strip 162. Alternatively, each acceleration lane 34 may include a primary element 36, such as described above, but the primary element 36 may be energized or otherwise excited in such a manner so as to function as a linear induction motor secondary element. With such a configuration, the guideway system 12 may be utilized by both the vehicles 14 and the vehicles 152. As yet another alternative, the guideway system 12 may be provided with guideway entrances that are configured to propel vehicles 14, and guideway entrances that are configured to propel vehicles 152.

As yet another alternative, each vehicle 152 may include one or more electric motors, such as wheel motors 170, and each transformer 172 may be used to provide power to a respective electric motor or motors. With such a configuration, vehicles 152 may be propelled along the guideway system 12 using the electric motors instead of, or in addition to, the linear induction motors.

While the best mode for carrying out the invention has been described in detail, those familiar with the art to which this invention relates will recognize various alternative designs and embodiments for practicing the invention as defined by the following claims.

What is claimed is:

1. A method for controlling operation of a vehicle on a guideway system, wherein the vehicle includes a first element of a linear induction motor and an alternate power source, and the guideway system has an acceleration section including a second element of the linear induction motor, and a computer control system, the method comprising:

utilizing the second element in cooperation with the first element so as to accelerate the vehicle on the acceleration section of the guideway system;

automatically sensing a main section of the guideway system for the presence of a suitable gap in traffic flow for receiving the vehicle from the acceleration section;

providing guidance instructions to the vehicle from the computer control system so as to route the vehicle to an aborted merge deceleration section of the guideway system if a suitable gap is not present; and providing speed instructions to the vehicle using the computer control system so as to cause the vehicle to use the alternate power source to maintain a desired cruising speed on a main section of the guideway system if the vehicle enters the main section of the guideway system.

2. The method of claim 1 wherein providing speed instructions includes instructing the vehicle to maintain the desired cruising speed at least 240 kilometers per hour.

3. The method of claim 1 further comprising providing acceleration instructions to the vehicle using the computer control system so as to cause the vehicle to accelerate on the acceleration section of the guideway system using the alternate power source.

4. The method of claim 1 wherein the first element is an active primary element, and the second element is a reactive secondary element.

5. The method of claim 1 wherein the first element is a reactive secondary element, and the second element is an active primary element.

6. The method of claim 1 further comprising decelerating the vehicle on the aborted merge deceleration section using a linear induction motor element of the aborted merge deceleration section.

7. The method of claim 6 further comprising converting kinetic energy from the vehicle to electrical energy, and supplying the electrical energy to the second element of the acceleration section.

8. The method of claim 1 further comprising automatically providing guidance instructions from the computer control system to a computer of the vehicle so as to route the vehicle to the main section of the guideway system if a suitable gap is present.

9. A method for controlling operation of a vehicle on a guideway system, wherein the guideway system has an acceleration section, a main section extending from the acceleration section and a computer control system, the method comprising:

sensing the main section of the guideway system for the presence of a suitable gap in traffic flow for receiving the vehicle from the acceleration section of the guideway system;

allowing the vehicle to travel from the acceleration section to an aborted merge deceleration section of the guideway system if a suitable gap is not present; and providing guidance instructions to the vehicle using the computer control system so as to route the vehicle from the acceleration section to the main section if a suitable gap is present.

10. The method of claim 9 further comprising decelerating the vehicle on the aborted merge deceleration section using a linear induction motor element of the aborted merge deceleration section if the vehicle travels to the aborted merge deceleration section.

11. The method of claim 10 further comprising converting kinetic energy from the vehicle to electrical energy if the vehicle travels to the aborted merge deceleration section, and supplying the electrical energy to a linear induction motor element of the acceleration section.

12. A method for achieving and maintaining a desired cruising speed for a vehicle on a guideway system, wherein the vehicle includes a reactive secondary element of a linear induction motor and an internal combustion engine, and the guideway system has an acceleration section including an active primary element of the linear induction motor, a main section extending from the acceleration section, and a computer control system, the method comprising:

sensing the main section of the guideway system for the presence of a suitable gap in traffic flow for receiving the vehicle from the acceleration section;

automatically determining when to begin acceleration of the vehicle so that the vehicle will reach a merge point on the main section at the same time as the gap in traffic flow;

providing acceleration instructions from the computer control system to the vehicle so as to cause the vehicle to accelerate on the acceleration section of the guideway system using the engine;

energizing the primary element of the linear induction motor so as to further accelerate the vehicle on the acceleration section, thereby approximately achieving the desired cruising speed for the vehicle;

sensing the main section of the guideway system to verify the presence of the gap in traffic flow after acceleration of the vehicle has begun but before the vehicle reaches the main section;

allowing the vehicle to travel to an aborted merge deceleration section of the guideway system if the gap in traffic flow is not present;

providing guidance instructions to the vehicle using the computer control system so as to route the vehicle to the merge point on the main section if the vehicle will reach the merge point at the same time as the gap in traffic flow; and providing speed instructions to the vehicle using the computer control system so as to cause the vehicle to use the engine to maintain the desired cruising speed on the main section of the guideway system.

13. A method for controlling operation of a vehicle on a guideway system, wherein the vehicle includes a first element of a linear induction motor and an alternate power source, and the guideway system has an acceleration section, a main section and a computer control system, the acceleration section including a second element of the linear induction motor, the method comprising:

utilizing the second element in cooperation with the first element to accelerate the vehicle on the acceleration section of the guideway system;

automatically sensing the main section of the guideway system for the presence of a suitable gap in traffic flow for receiving the vehicle from the acceleration section;

allowing the vehicle to travel to an aborted merge deceleration section of the guideway system if a suitable gap is not present; and providing speed instructions to the vehicle using the computer control system so as to cause the vehicle to use the alternate power source to maintain a desired cruising speed on the main section of the guideway system if the vehicle enters the main section of the guideway system.

14. The method of claim 13 further comprising decelerating the vehicle on the aborted merge deceleration section using a linear induction motor element of the aborted merge deceleration section if the vehicle travels to the aborted merge deceleration section.

15. The method of claim 14 further comprising converting kinetic energy from the vehicle to electrical energy, and supplying the electrical energy to the second element of the acceleration section if the vehicle travels to the aborted merge deceleration section.

* * * * *